US008068013B2

(12) United States Patent
Otsuka et al.

(10) Patent No.: US 8,068,013 B2
(45) Date of Patent: Nov. 29, 2011

(54) RF COMMUNICATION MODULE AND RF COMMUNICATION SYSTEM

(75) Inventors: Kenji Otsuka, Tokyo (JP); Nobuhide Ninomiya, Tokyo (JP)

(73) Assignee: SMK Corporation, Tokyo (JP)

( * ) Notice: Subject to any disclaimer, the term of this patent is extended or adjusted under 35 U.S.C. 154(b) by 1018 days.

(21) Appl. No.: 11/956,442

(22) Filed: Dec. 14, 2007

(65) Prior Publication Data

US 2008/0143551 A1 Jun. 19, 2008

(30) Foreign Application Priority Data

Dec. 15, 2006 (JP) ................................ 2006-338318

(51) Int. Cl.
*G05B 11/01* (2006.01)
*G08C 19/16* (2006.01)

(52) U.S. Cl. ................. 340/12.22; 340/4.11; 340/12.28; 340/10.5; 455/352; 455/92; 341/176; 341/173

(58) Field of Classification Search ............... 340/12.22, 340/852.72, 12.28; 455/352, 92; 341/173, 341/176

See application file for complete search history.

(56) References Cited

U.S. PATENT DOCUMENTS

| | | | | |
|---|---|---|---|---|
| 5,546,411 | A * | 8/1996 | Leitch et al. | 714/708 |
| 5,585,953 | A | 12/1996 | Zavrel | |
| 6,021,319 | A | 2/2000 | Tigwell | |
| 6,137,421 | A * | 10/2000 | Dykema | 340/12.28 |
| 6,640,144 | B1 * | 10/2003 | Huang et al. | 700/65 |
| 6,895,252 | B2 * | 5/2005 | Pugel | 455/500 |
| 6,956,496 | B1 * | 10/2005 | Herz | 340/4.33 |
| 7,161,524 | B2 * | 1/2007 | Nguyen | 341/176 |
| 7,586,398 | B2 * | 9/2009 | Huang et al. | 340/10.5 |
| 2002/0154024 | A1 * | 10/2002 | Stevenson et al. | 340/825.22 |
| 2002/0163905 | A1 * | 11/2002 | Brabrand | 370/347 |
| 2004/0189485 | A1 | 9/2004 | Wang | |

(Continued)

FOREIGN PATENT DOCUMENTS

EP 1 677 269 A2 7/2006

(Continued)

OTHER PUBLICATIONS

European Search Report for EP 10 00 5582, dated Aug. 25, 2010.

*Primary Examiner* — Daniel Wu
*Assistant Examiner* — Muhammad Adnan
(74) *Attorney, Agent, or Firm* — Edwards Wildman Palmer LLP; Peter C. Schechter; Brian R. Landry

(57) ABSTRACT

A RF communication system includes a RF communication module capable of controlling either an IR communication system-controlled device or a controlled device not equipped with a reception circuit for receiving IR signals remotely with RF signals. The RF communication module is equipped with an antenna for receiving RF signals, a RF communication circuit for demodulating the remote control data from the RF signal received by the antenna, a UART interface for outputting bit stream remote data to a device-side microcomputer of the controlled device, and a communication control unit having two types of communication interfaces in a pulse signal interface that outputs a pulse modulated signal, having been pulse modulated with remote control data, to a pulse modulated signal input port of the device-side microcomputer, so that remote control data transmitted by RF signals is output freely, as either bit stream or pulse modulated signals, to a device-side microcomputer of the controlled device.

15 Claims, 6 Drawing Sheets

U.S. PATENT DOCUMENTS

| | | | | |
|---|---|---|---|---|
| 2005/0212690 | A1* | 9/2005 | Nishikawa | 340/932.2 |
| 2006/0168618 | A1 | 7/2006 | Choi | |
| 2007/0176787 | A1* | 8/2007 | Iten et al. | 340/825.69 |
| 2008/0253472 | A1 | 10/2008 | Griep | |

FOREIGN PATENT DOCUMENTS

| | | | |
|---|---|---|---|
| JP | 2001-169368 | | 6/2001 |
| JP | 2001169368 | A * | 6/2001 |
| JP | 2002364221 | A * | 12/2002 |
| JP | 2004-031999 | | 1/2004 |
| JP | 2004031999 | A * | 1/2004 |
| JP | 2006-522556 | | 9/2006 |
| WO | 9505709 | A1 | 2/1995 |
| WO | 2005117303 | A1 | 12/2005 |

* cited by examiner

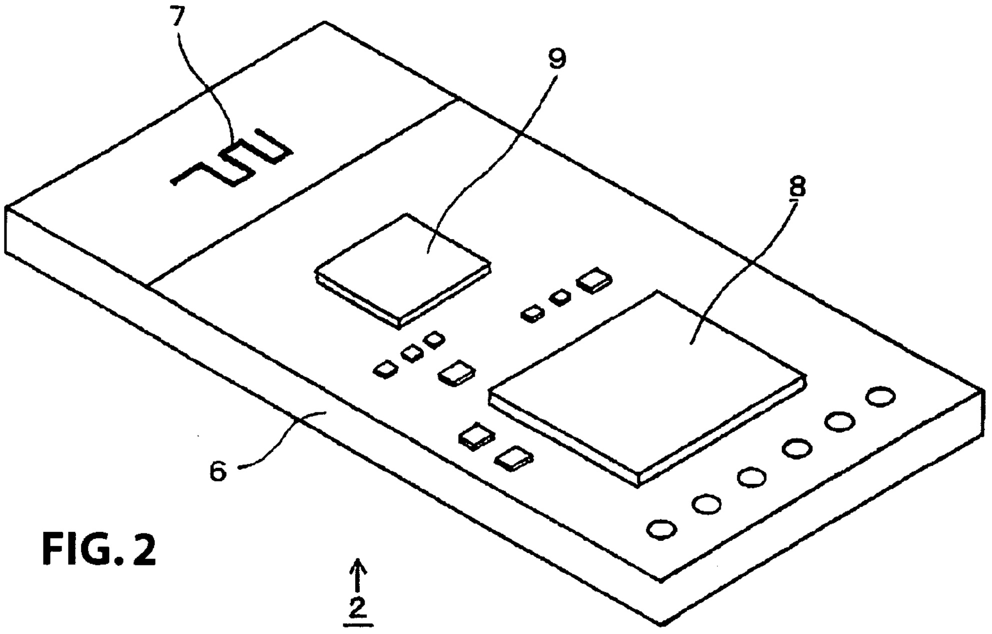

FIG. 2

UART data format

| Start text | Output code | Data length | Transmission data | End text |
|---|---|---|---|---|

| Control code | Description |
|---|---|
| 40h | UART data output |
| 51h | PWM output with company A's format no. 1 |
| 52h | PWM output with company A's format no. 2 |
| 523h | PWM output with company B's format no. 1 |
| A0h | UART data inspection output |
| B1h | PWB inspection output with company A's format no. 1 |
| B2h | PWB inspection output with company A's format no. 2 |

FIG. 3

FIG. 4

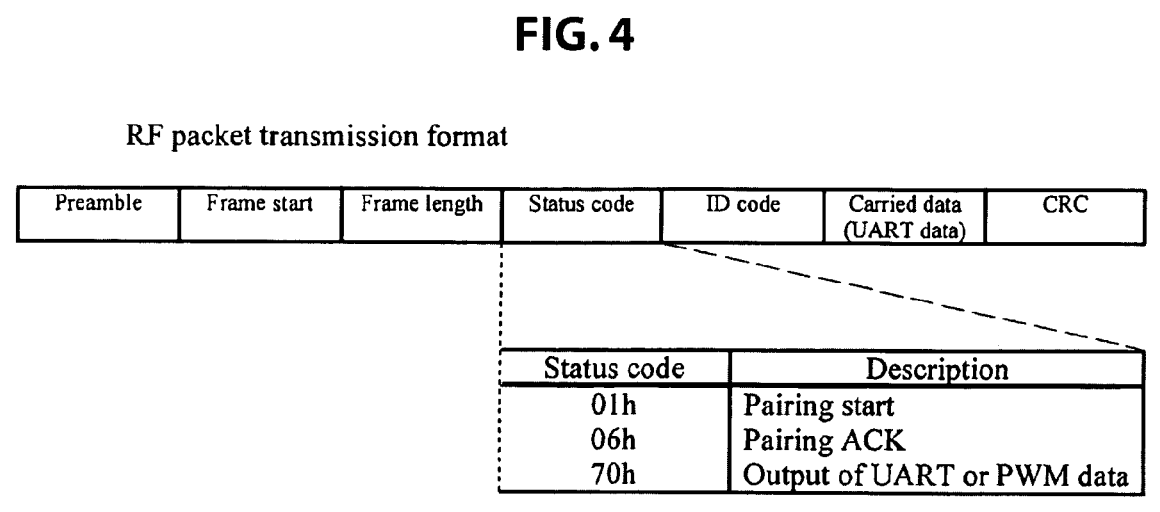

RF packet transmission format

| Preamble | Frame start | Frame length | Status code | ID code | Carried data (UART data) | CRC |
|---|---|---|---|---|---|---|

| Status code | Description |
|---|---|
| 01h | Pairing start |
| 06h | Pairing ACK |
| 70h | Output of UART or PWM data |

RF COMMUNICATION MODULE AND RF COMMUNICATION SYSTEM

CROSS-REFERENCE TO RELATED APPLICATION

The present application claims priority under 35 U.S.C. §119 to Japanese Patent Application No. 2006-338318, filed Dec. 15, 2006, and which is hereby incorporated herein by reference in its entirety.

FIELD OF THE INVENTION

The present invention relates to a RF communication system that remotely controls a controlled device by wireless communication and a RF communication module used in a RF communication system, and particularly relates to a RF communication module and a RF communication system that enable a device controlled by infrared communication to be controlled remotely by wireless communication.

BACKGROUND OF THE INVENTION

To control remotely household electronic appliances such as air conditioners, televisions or the like, infrared communication (IR communication) is generally used, whereby a remote control transmitter transmits an infrared control signal (IR signal) of infrared rays to the household appliances. In an IR communication system used in a home, an appropriate pulse modulation method is employed to carry IR signal control data from the remote control transmitter. For example, with a pulse width modulation (PWM) method, according to the control data for the device to be controlled, PWM modulation signals of differing pulse widths are modulated corresponding to the value of bit data thereof, and in order to prevent interference from other devices and mistaken operation, an IR signal created by secondarily modulating the PWM modulated signal with a 38 kHz carrier modulation wave is transmitted to the household appliances and other devices to be controlled.

At a controlled device, the IR signal is opto-electrically converted by a light-receiving element, passed through a bandpass filter that passes the 38 kHz signal, and the envelope of the signal output therefrom is waveform-shaped and then demodulated into the PWM modulated signal. A device-side microcomputer of the controlled device is provided with a PWM input port for receiving the PWM modulated signal. The device-side microcomputer demodulates the control data from the PWM modulated signal, and operates the various portions of the controlled device according to the control data.

In remote control implemented with this IR communication system, due to the blocking of IR signals by shielding material interposed between the remote control transmitter and the controlled device or due to the limited angle of directivity of a light-emitting element that emits the IR signal, the IR signal may not reach the light-receiving element unless the IR signal is precisely emitted in the direction toward the light-receiving element of the controlled device. With larger screen televisions, for example, the display size of which has been increasing in recent years, as a result of design restrictions, the location at which the light-receiving element is installed is often not obvious, and a problem occurs in which an IR signal is transmitted toward a different location and the device to be controlled does not respond to the remote control transmitter.

Thus, attention is being drawn to a wireless RF (radio frequency) wave communication (RF communication) system for carrying RF signals without restriction on the direction of transmission and that enables transmission even when shielding material is interposed. In a RF communication system, for example, a 2.4 GHz band RF signal modulated with control data from the remote control transmitter is transmitted from an antenna, and the RF signal is received by an antenna at an RF reception circuit unit at the controlled device and passed through a bandpass filter, so that only the 2.4 GHz band RF signal is input. The control data is then demodulated from the RF signal. The demodulated control data is outputted to a device-side microcomputer of the controlled device, and the device-side microcomputer operates the various portions of the controlled device according to the control data.

Many existing household appliances (i.e., controlled devices) are controlled by a remote control transmitter with an IR communication system. In a known RF communication system as disclosed in Japanese Unexamined Patent Application Publication No. 2004-31999, which is incorporated by reference herein in its entirety, a wireless/infrared adapter that converts RF signals into IR signals is interposed to enable even an IR signal-controlled device to be controlled remotely with a remote control transmitter that transmits RF signals.

A conventional RF communication system 100 in which a wireless/infrared adapter is interposed is described with reference to FIG. 7. In this figure, reference numerals 101*a* and 101*b* indicate a PC (personal computer) and PDA (personal digital assistant), respectively, each constituting a remote control transmitter 100 capable of transmitting and receiving control data, and RF signals transmitted from these remote control transmitters 101 are received at an antenna 104*a* of a wireless transceiver unit 104 provided on a wireless/infrared adapter 103. A conversion unit 105 of a wireless/infrared adapter 103 demodulates the control data from the RF signal, converts the demodulated control data into a pulse modulated signal that can be demodulated by the controlled devices 107, e.g. a TV 107*a*, a VCR 107*b* and so on, and then outputs [the pulse modulated signal] to an infrared transceiver unit 106. The infrared transceiver unit 106 outputs a pulse modulated IR signal, having been pulse modulated with the control signal, to the controlled devices 107.

Accordingly, with the conventional RF communication system 100, the positioning of the wireless/infrared adapter 103 that transmits IR signals in the vicinity of controlled devices 107 that are not blocked by a shielding material enables existing IR communication system-controlled devices 107 to be controlled remotely with the remote control transmitter 101 that transmits RF signals, without consideration of the existence of shielding material or the transmitting direction of the remote control transmitter 101.

A remote control transmitter as disclosed in Japanese Unexamined Patent Application Publication No. 2006-522556, which is incorporated by reference herein in its entirety, is capable of transmitting and receiving either IR signals or RF signals, and capable of controlling remotely either an existing IR communication system-controlled device or a RF system-controlled device. A RF communication system as disclosed in Japanese Unexamined Patent Application Publication No. 2001-169368, which is incorporated by reference herein in its entirety, includes a RF reception circuit unit for receiving RF signals that is added to an existing IR communication system-controlled device thereby also enabling the device to be controlled remotely with a RF communication system.

The conventional RF communication system 100 as illustrated by FIG. 7 requires that a wireless/infrared adapter 103 be positioned between the controlled device and the transmitter. However, positioning of the RF communication system 100 between the controlled device and the transmitter at a location free from any shielding material that does not obstruct movement within a home is extremely difficult, and may be aesthetically impractical.

Moreover, the RF signal reception is in a hot standby state, and the large quantity of electric power consumed during standby quickly drains an internal battery and necessitates the use of a power supply cable to supply electric power. The wiring of a power supply cable within a home, however, creates a problem of additional complexity.

In the remote control transmitter capable of transmitting and receiving either IR signals or RF signals cited in Japanese Unexamined Patent Application Publication No. 2006-522556, an existing IR communication system-controlled device can be controlled remotely, but in the transmission and reception of signals to and from an existing IR signal-controlled device, the problem arising from an IR communication system, whereby the device cannot be controlled due to the direction of IR signal transmission or the existence of shielding material, is present as before.

Additionally, in the RF communication system as disclosed in Japanese Unexamined Patent Application Publication No. 2001-169368 in which a RF reception circuit unit for receiving RF signals is added to an existing IR communication system-controlled device, there is a problem whereby the mere addition of a RF reception circuit unit does not enable the output thereof to be connected to a device-side microcomputer of the controlled device. Namely, the RF communication system uses serial communication, and the control data output from the RF reception circuit unit is bit stream data. Therefore, a universal asynchronous receiver transmitter (UART) for converting the serial bit stream into parallel byte-data used by the device-side microcomputer must be interposed between the RF reception circuit and the device-side microcomputer.

Moreover, the device-side microcomputer mounted on the controlled device is often an IC chip developed specifically for an IR communication system, and in response to requests for lower cost, is provided only with a pulse modulated signal input port, such as a PWM input port. When using a RF communication system to control a controlled device equipped with this type of device-side microcomputer, the addition of only a RF reception circuit unit having an antenna and a UART interface is insufficient, and an extensive modification is required in which the entire chip, including the device-side microcomputer, is replaced.

SUMMARY OF THE INVENTION

The present invention was devised in consideration of these types of conventional problems, and an object of the present invention is to provide a RF communication module and RF communication system capable of remotely controlling with a RF signal either an IR communication system-controlled device or a controlled device not equipped with a reception circuit for receiving IR signals.

Another object is to provide a RF communication module and RF communication system that enable a controlled device, even a controlled device having a device-side microcomputer specifically for an IR communication system, to be controlled by an RF communication system with a simple modification that does not change the device-side microcomputer.

Another object is to provide a RF communication module and RF communication system for controlling an IR communication system-controlled device with RF signals, which can transmit remote control data during a shorter time than that required for pulse modulated signals.

Another object is to provide a RF communication module and RF communication system capable of transmitting the same format RF signal to control a plurality of controlled devices controlled by pulse modulated signals of various different pulse modulated signal formats.

Another object is to provide a RF communication module and RF communication system capable of attaining stable RF signal reception characteristics, even if the controlled device that is controlled remotely by RF signals is mass-produced.

Another object is to provide a RF communication system capable of the bi-directional transmission and reception of RF signals using identically configured RF communication modules in the remote control transmitter and in the controlled device.

To attain the above-described objects, an RF communication module is characterized by an antenna for receiving a RF signal, modulated with remote control data, and transmitted from a remote control transmitter; a RF communication circuit unit for demodulating, from the remote control data, the RF signal received by the antenna; and a communication control unit having two types of communication interfaces: a UART interface, freely connectable to a device-side microcomputer of a device to be controlled remotely by a remote control transmitter, for outputting the remote control data demodulated at the RF communication circuit unit as bit stream remote control data, and a pulse signal interface, freely connectable to a pulse modulated signal input port of the device-side microcomputer, for outputting a pulse modulated signal, pulse modulated with remote control data, and having been demodulated at the RF communication circuit unit; wherein, the remote control data transmitted by the RF signal is output freely, as either a bit stream or pulse modulated signal, to the device-side microcomputer of the controlled device.

A device-side microcomputer of a controlled device not equipped with a reception circuit for receiving IR signals connects to the UART interface of the communication control unit, and the remote control data demodulated at the RF communication module is output, as bit stream remote control data, to the device-side microcomputer. Moreover, the device-side microcomputer of a controlled device controlled by an IR communication system has a pulse modulated signal input port, and therefore, by connecting the pulse signal interface of the communication control unit to the pulse modulated signal input port of the device-side microcomputer, a pulse modulated signal, modulated with remote control data, and having been demodulated at the RF communication module is output.

The RF communication module may be further characterized by the RF signal being modulated with remote control data containing an output code for selecting either UART output or pulse signal output; and the communication control unit outputting bit stream remote control data from the UART interface in the case where an output code for selecting UART output is contained in the remote control data demodulated at the RF communication circuit unit, and outputting a pulse modulated signal from the pulse signal interface in the case where an output code for selecting pulse signal output is contained therein.

The remote control data demodulated at the RF communication module is output, according to the output code contained in the remote control data, as either bit stream remote control data or a pulse modulated signal to the device-side microcomputer of the controlled device.

The RF communication module may be characterized by the communication control unit having a format storage unit for associating each pulse modulated signal format with an output code and for storing pulse modulated signal formats that can be demodulated by the device-side microcomputers of a plurality of controlled devices; and in the case where an output code associated with a specific pulse modulated signal format is contained in the remote control data demodulated at the RF communication circuit unit, by reading out the pulse modulated signal format associated with the output code from the format storage unit, and according to the read-out pulse modulated signal format, outputting a pulse modulated signal having been pulse modulated with the remote control data.

In the case where an output code associated with a specific pulse modulated signal format is contained in the remote control data demodulated at the RF communication unit, the pulse modulated signal format associated with that output code from the format storage unit is read out, and a pulse modulated signal, having been pulse modulated with the remote control data, is outputted from the pulse signal interface to the device-side microcomputer, in the pulse modulated signal format that has been read out.

Accordingly, by setting the output code for generating remote control data at the remote control transmitter, a pulse modulated signal in a pulse modulated signal format capable of being demodulated by the device-side microcomputers of various controlled devices is output.

The RF communication module may be further characterized by the RF communication circuit unit and the communication control unit being formed with IC chips mounted on the same module substrate, and the antenna being formed from a printed antenna that is printed on the module substrate.

An IC chip antenna and a printed antenna have low tolerances in their manufacturing and mounting processes, and because they can be formed on a module substrate at the same location and with the same structure, even when mass-produced, standardized RF communication modules having stable RF communication characteristics can be obtained.

The RF communication system may be characterized by a pair of identically configured RF communication modules equipped with a communication control unit having two types of communication interfaces: a UART interface, connectable to a remote control-side microcomputer that generates remote control data for a remote control transmitter and to a device-side microcomputer that operates a controlled device according to the remote control data, for inputting and outputting bit stream remote control data with the remote control-side microcomputer or the device-side microcomputer, and a pulse signal interface, connectable to a pulse modulated signal input port of the device-side microcomputer, for outputting a pulse modulated signal, having been pulse modulated with the remote control data, to the device-side microcomputer; an antenna for transmitting and receiving a RF signal modulated with the remote control data; and a RF communication circuit for outputting, to the antenna, a RF signal modulated with the remote control data to be outputted from the communication control unit and for outputting, to the communication control unit, remote control data demodulated from the RF signal received by the antenna; wherein the UART interface of one of the RF communication modules connects to the remote control-side microcomputer, and according to an input operation to the remote control transmitter, an RF signal modulated with the remote control data generated at the remote control-side microcomputer is transmitted from the antenna of the one RF communication module; the UART interface or the pulse signal interface of the other RF communication module connects to the device-side microcomputer or the pulse modulated signal input port of the device-side microcomputer; and the remote control data to be transmitted with a RF signal from the one RF communication module is outputted as a bit stream or pulse modulated signal to the device-side microcomputer of the controlled device.

Connecting one each of a pair of RF communication modules having the same configuration to a remote control-side microcomputer and to a device-side microcomputer, respectively, enables bi-directional RF signal transmission. In the case where a RF communication module is to be connected to the device-side microcomputer of a controlled device not equipped with a reception circuit for receiving IR signals, the UART interface of the communication control unit is connected to the device-side microcomputer, and the remote control data generated at the remote control-side microcomputer is output, as bit stream remote control data, to the device-side microcomputer. Moreover, in the case where a RF communication module is to be connected to the device-side microcomputer of a controlled device controlled by an IR communication system, the pulse signal interface of the communication control unit is connected to the pulse modulated signal input port of the device-side microcomputer and the remote control data generated by the remote control-side microcomputer is output as a pulse modulated signal having been modulated at the communication control unit.

The RF communication system may be further characterized by an output code for selecting either UART output or pulse signal output being contained in the remote control data generated at the remote control-side microcomputer; and by the communication control unit of the other RF communication module outputting bit stream remote control data from the UART interface in the case where an output code for selecting UART output is contained in the remote control data demodulated at the RF communication circuit unit, and outputting a pulse modulated signal from the pulse signal interface in the case where an output code for selecting pulse signal output is contained therein.

In the case where the output code for UART output is contained in the remote control data, bit stream remote control data from the UART interface is output to the device-side microcomputer, and in the case where the output code for pulse signal output is contained in the remote control data, a pulse modulated signal that has been modulated with the remote control data is output to the pulse modulated signal input port of the device-side microcomputer.

The RF communication system cited may be characterized by the communication control unit having a format storage unit for associating each pulse modulated signal format with an output code and for storing pulse modulated signal formats that can be demodulated by the device-side microcomputers of a plurality of controlled devices; and in the case where an output code associated with a specific pulse modulated signal format is contained in the remote control data demodulated at the RF communication circuit unit of the other RF communication module, the communication control unit reads out the pulse modulated signal format associated with the output code from the format storage unit, and according to the read-out pulse modulated signal format, outputs a pulse modulated signal having been pulse modulated with the remote control data.

The remote control-side microcomputer includes in the remote control data an output code associated with a pulse modulated signal format that can be demodulated by the device-side microcomputer, and as a result, a pulse modulated signal in a pulse modulated signal format that can be demodulated by the device-side microcomputer is output to the pulse modulated signal input port of the device-side microcomputer of the controlled device.

The RF communication system may be further characterized by a remote control-side microcomputer for generating remote control data that includes control data for controlling operation of a controlled device according to an input operation; a remote control transmitter equipped with a RF transmission circuit unit for modulating a RF signal with remote control data generated by the remote control-side microcomputer and for outputting the modulated signal from a transmission antenna; a RF reception circuit unit for demodulating remote control data from a RF signal received with a reception antenna; a device-side microcomputer for demodulating control data from a pulse modulated signal input from a pulse signal input port; a format storage unit for associating each pulse modulated signal format with an output code and for storing pulse modulated signal formats that can be demodulated by the device-side microcomputers of a plurality of controlled devices; and a controlled device equipped with a pulse modulation circuit, wherein in the case where an output code associated with a specific pulse modulated signal format is contained in the remote control data demodulated at the RF reception circuit unit, the pulse modulation circuit reads out the pulse modulated signal format associated with the output code from the format storage unit, and according to the read-out pulse modulated signal format, outputs to the pulse signal input port of the device-side microcomputer a pulse modulated signal, having been pulse modulated with control data contained in the remote control data; wherein the remote control-side microcomputer includes an output code, specifying a pulse modulated signal format that can be demodulated by the device-side microcomputer of the controlled device, together with control data, in the remote control data, and the pulse modulation circuit of the controlled device reads out the pulse modulated signal format associated with the output code contained in the remote control data, and according to the read-out pulse modulated signal format, outputs to the device-side microcomputer, a pulse modulated signal having been pulse modulated with control data.

The remote control-side microcomputer includes in the remote control data an output code associated with a pulse modulated signal format that can be demodulated by the device-side microcomputer, and as a result, the control data and output code are transmitted by RF signals to the controlled device. The RF reception circuit unit of the controlled device demodulates control data and the remote control data containing the output code from the RF signals received by the antenna, and the pulse modulation circuit outputs a pulse modulated signal, having been pulse modulated with control data, to the pulse signal input port of the device-side microcomputer according to the pulse modulated signal format associated with the output side.

BRIEF DESCRIPTION OF THE DRAWINGS

The invention will become more readily apparent from the Detailed Description of the Invention, which proceeds with reference to the drawings, in which:

FIG. 2 is a perspective view of a RF communication module 2 according to the principles of the present invention.

FIG. 3 is an explanatory diagram showing the format of UART data inputted and outputted via a UART interface 5.

FIG. 4 is an explanatory diagram showing the format of RF packets transmitted and received as RF signals.

Figure 1:
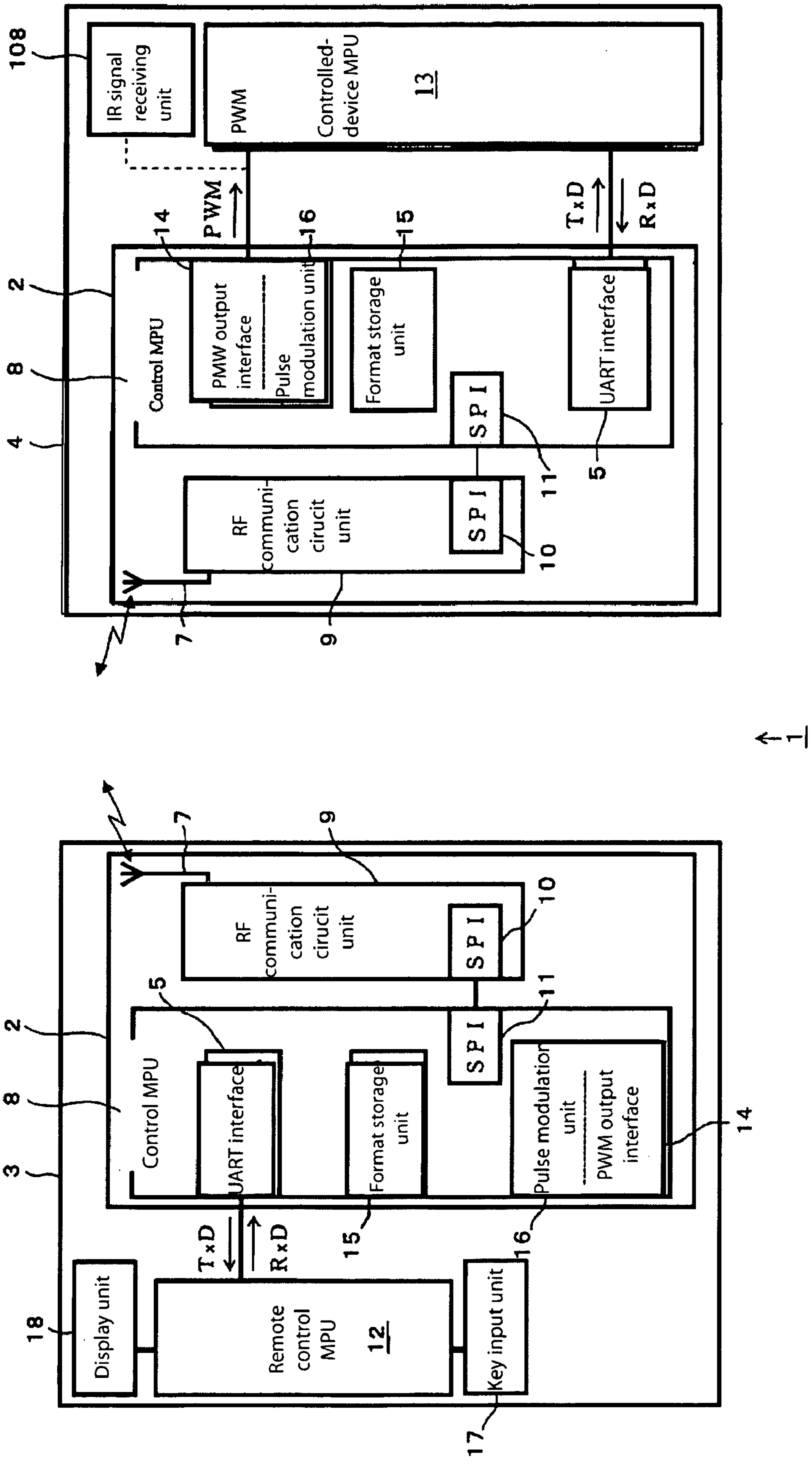
FIG. 1 is a block diagram showing an overall configuration of a RF communication module and a RF communication system 1 according to the principles of the present invention.

In the figures, elements that are repeatedly illustrated are consistently identified by a single reference numeral.

DETAILED DESCRIPTION OF THE INVENTION

The following table provides a key to the reference numerals and elements depicted in the drawings:

1 RF communication system
2 RF communication module
3 Remote control transmitter
4 Controlled device
5 UART interface
7 Antenna (printed antenna)
8 Communication control unit (control MPU)
9 RF communication circuit unit
12 Remote control-side microcomputer (remote control MPU)
13 Device-side microcomputer (controlled device MPU)
14 Pulse signal interface (PWM output interface)
15 Format storage unit In accordance with the present invention, remote control by RF signals transmitted from a remote control transmitter is possible with either a controlled device that is controlled by an IR communication system and has a pulse modulated signal input port or a controlled device that is controlled by a RF communication system and is not equipped with a reception circuit for receiving IR signals.

For example, the remote control transmitter may select an output code for either UART output or pulse signal output depending upon whether the device-side microcomputer of the controlled device inputs bit stream remote control data or a pulse modulated signal, thereby enabling the remote control transmitter to output remote control data that matches the device-side microcomputer input format.

By including, in the remote control data for controlled devices having different type of pulse modulated signal formats, an output code specifying a pulse modulated signal format that can be demodulated by the controlled device at the remote control-side, various types of IR communication system-controlled devices can be controlled remotely by RF signals.

Moreover, instead of transmitting pulse modulated signals, the format of which has a longer transmission time than that of RF signals, from the remote control transmitter, only remote control data containing an output code is transmitted with RF signals so that the transmission time is reduced. Because pulse modulated signals are not transmitted with IR signals, the communication environment and the transmission and reception elements do not cause pulse distortion, and the remote control data is sent accurately. Because the portions of the RF communication system having a RF communication function can be standardized, RF communication modules can be used as general-purpose modules with various controlled devices.

Moreover, both an IC chip antenna and a printed antenna can be made with the same module substrate material properties and same circuit patterns, e.g. same pattern locations and through hole locations, and therefore an antenna pattern having optimal characteristics can be obtained without having to design antenna patterns on a case-by-case basis according to the RF communication environment.

Even with a device-side microcomputer that obtains remote control data either from inputted bit stream remote control data or from a pulse modulated signal that has been pulse modulated with remote control data, RF signals can be transmitted and received, bi-directionally, between the remote control transmitter and the controlled device. Accordingly, the controlled device can be controlled remotely with RF signals, and operating information of the controlled device can be transmitted to a remote control-side transmitter and verified locally by an operator.

RF communication modules are shared in the RF communication between the remote control transmitter-side and the controlled device-side, and therefore the number of components can be reduced and the total system cost can be decreased.

According to the present invention, because the output code can be set with the remote control-side microcomputer of a remote control transmitter corresponding to whether the device-side microcomputer of a controlled device obtains remote control data from either bit stream remote control data or from a pulse modulated signal that has been pulse modulated with remote control data, RF signals can be transmitted to control a controlled device that is controlled by either a RF communication system or an IR communication system.

By including in the remote control data an output code associated with a pulse modulated signal format that can be demodulated by the device-side microcomputer, various types of controlled devices that are controlled by an IR communication system can be controlled remotely by RF signals with a remote control-side microcomputer. Moreover, controlled devices having different types of pulse modulated signal formats for which demodulation from the pulse modulated signal is possible can be controlled with RF signals by using identically configured RF communication modules, and the RF communication modules can be used generally with various types of controlled devices.

Moreover, instead of transmitting pulse modulated signals, the format of which has a longer transmission time than that of RF signals, from the remote control transmitter, only remote control data containing an output code is transmitted with RF signals so that the transmission time is reduced. Because pulse modulated signals are not transmitted with IR signals, the communication environment and the transmission and reception elements do not cause pulse distortion, and the remote control data is sent accurately. Various types of controlled devices that are controlled by pulse control signals of different pulse modulated signal formats can be controlled remotely with RF signals, without modifying the configuration of the device-side microcomputer.

Figure 5:
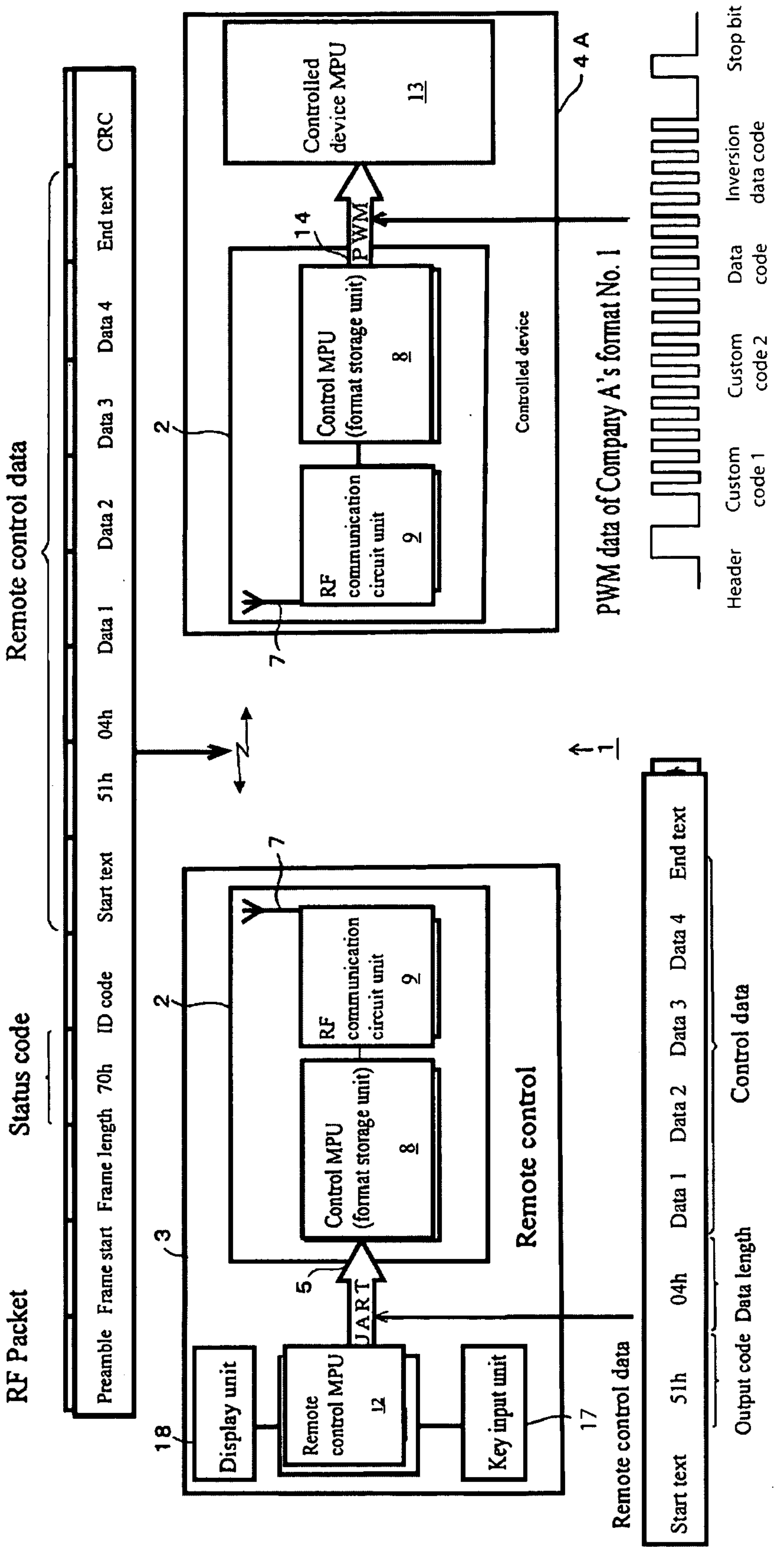
FIG. 5 is an explanatory diagram showing an example of the RF signal transmission of control data to an IR communication system-controlled device 4A configured so as to be controlled by IR signals.
Figure 6:
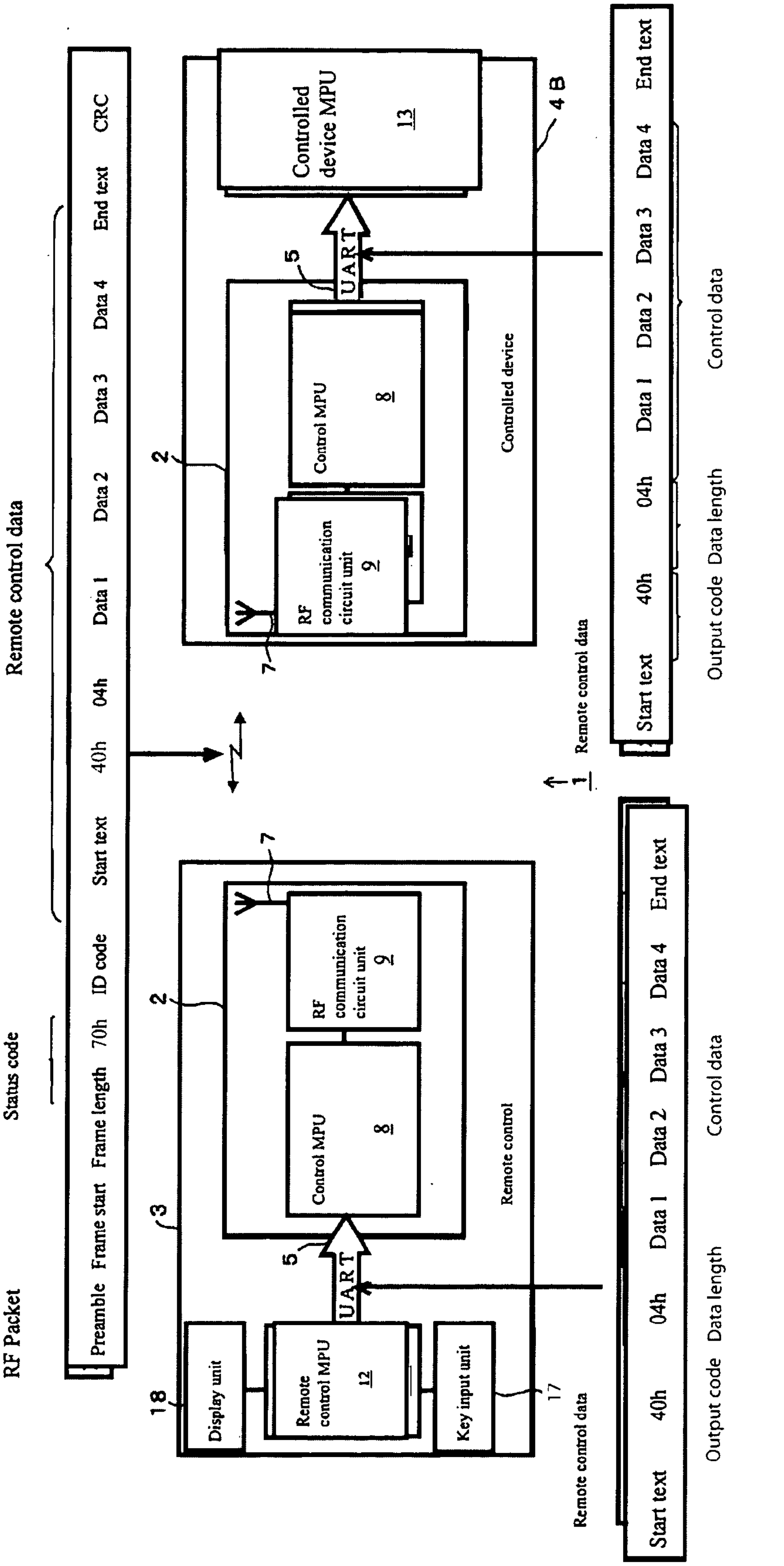
FIG. 6 is an explanatory diagram showing an example of the RF signal transmission of control data to a RF communication system-controlled device 4B.
Figure 7:
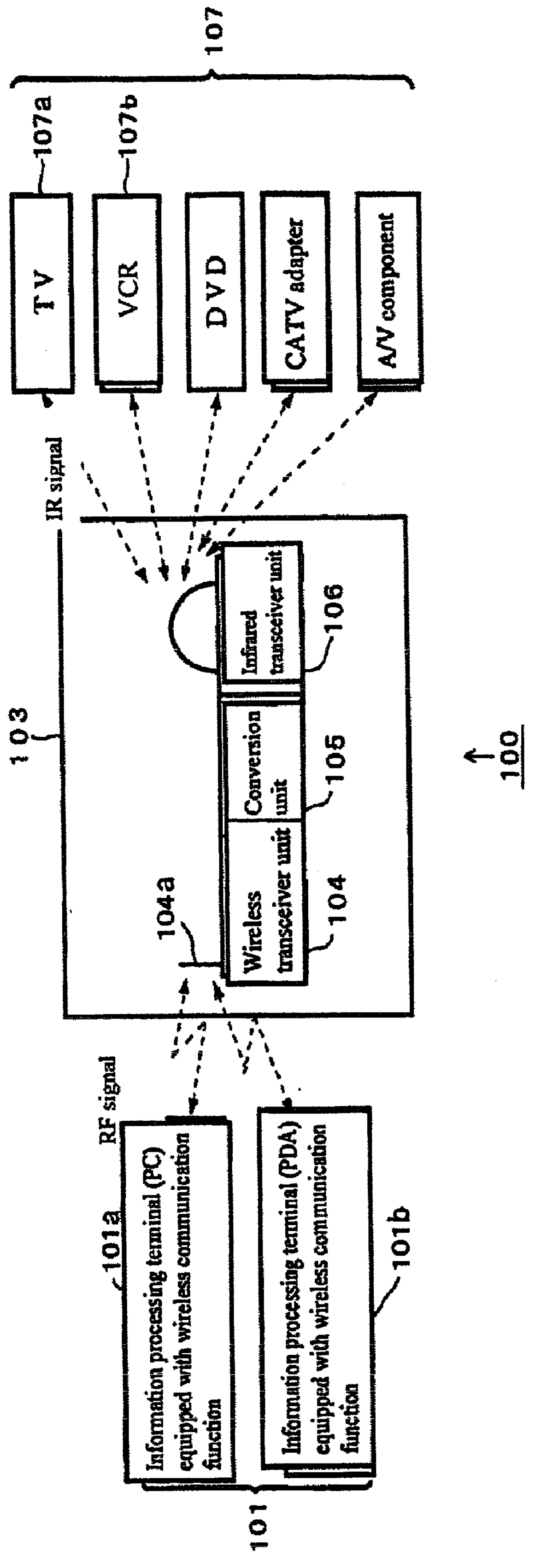
FIG. 7 PRIOR ART
FIG. 7 is a block diagram showing a conventional RF communication system 100

A RF communication system 1 and a RF communication module 2 used in a RF communication system 1 in an embodiment of the present invention are described below using FIGS. 1 to 6. FIG. 1 is a block diagram showing the entire configuration of a RF communication system 1 comprising a pair of identically configured RF communication modules 2 and 2 respectively used in a remote control transmitter 3 and in a controlled device 4. FIG. 2 is a perspective view of the RF communication module 2. FIG. 3 is an explanatory diagram showing the format of UART data inputted and outputted via a UART interface 5. FIG. 4 is an explanatory diagram showing the format of RF packet data transmitted and received with RF signals. Also, FIGS. 5 and 6 are explanatory diagrams showing examples of the transmission of control data by RF signals to an IR communication system-controlled device 4A configured so as to be controlled by IR signals and a RF communication system-controlled device 4B configured so as to be controlled by RF signals.

In the present embodiment, the RF communication module 2 shown in FIG. 2 is used in the same configuration in both the remote control transmitter 3 on the RF signal transmitting-side and the controlled device 4 on the receiving-side. The RF communication module 2 may be configured on one side of a printed circuit board 6 from a printed antenna 7 formed by print-wiring a conducting pattern, and on the remaining mounting surface are mounted a control-use MPU forming a communication control unit 8 and a RF communication-use IC chip forming a RF communication circuit unit 9.

By using a circuit board of expensive glass epoxy resin having excellent electrical and mechanical stability as the printed circuit board 6, and forming the printed antenna 7 by print-wiring on the printed circuit board 6 having high conductivity, good RF communication characteristics and uniform communication characteristics, without being affected by manufacturing errors or the like, can be obtained. Since the printed antenna 7 is used as a transmitting and receiving antenna, a power supply at one end thereof is connected to a RF signal I/O port (not shown) of the RF communication circuit unit 9.

The RF communication circuit unit 9 is equipped with a DSSS direct sequence spread spectrum (DSSS)[1] modulator-demodulator (not shown) and outputs to the printed antenna 7 a RF signal spread-spectrum modulated by the data in a RF packet (to be described later) that is output from the communication control unit 8, and demodulates RF packet data from the RF signal received at the printed antenna 7 and outputs the demodulated RF packet data to the communication control unit 8 connected through an SPI (serial peripheral interface) 10. The RF signal modulated at the RF communication circuit unit 9 is spread-modulated to one of a plurality of channels set to a 2 MHz bandwidth spaced apart at 5 MHz intervals in a 2.4 GHz band.

[1] See e.g., "An Introduction to Direct-Sequence Spread-Spectrum Communications," Maxim Integrated Products, 2003, which is incorporated by reference herein in its entirety.

The communication control unit 8 connected through an SPI 11 to the RF communication circuit unit 9 is equipped with a UART interface 5 for inputting and outputting serial transmission data (TxD) and reception data (RxD), and is capable of connecting to a remote control-side microcomputer (remote control MPU) 12 or a device-side microcomputer (controlled-device MPU) 13, and a pulse signal interface 14 capable of connecting to the device-side microcomputer (controlled-device MPU) 13 having a pulse modulated signal input port. Namely, as shown in FIG. 1, MPUs 12 and 13 incorporate a UART universal asynchronous receiver transmitter (UART) for converting serial bit stream data into parallel byte data handled by the MPU, and in the case where the MPUs 12 and 13 have I/O ports for inputting and outputting the serial transmission data (TxD) and reception data (RxD), [the I/O ports] are connected to the UART interface 5, and in the case where the controlled-device MPU 13 has a pulse modulated signal input port (PWM input port in the present embodiment) for inputting pulse modulated signals, the pulse modulated signal input port is connected, together with the UART interface 5 or separately, to a pulse signal interface (PWM output interface) 14.

When MPU 12 inputs UART data (to be described later) through the UART interface 5, the communication control unit 8 generates, from RF signals, a RF packet to be transmitted, and outputs [the RF packet] to the RF communication circuit unit 9. The format of the RF packet is explained below with reference to FIG. 4. Following a preamble and a 1-byte frame start signal indicating the beginning of a communication frame is a "frame length" that expresses with 1-byte data the length of the entire frame. Following the "frame length" is a "status code" of 1-byte data that makes known the status of the communication target of the RF signal. The "status code" is assigned the value of "01h" when specifying the communication target (pairing), "06h" when acknowledging the communication target, and "07h" when UART data is carried. An "ID code" specifies with a manufacturing date, product number or the like, the RF communication module 2 that is the source of the communication, and the receiving side uses this "ID code" to distinguish the communication target specified by pairing. Therefore, at the receiving side, reception is denied of an RF signal that does not match the "ID code" of the communication target as specified by pairing, and even if another device is equipped with a RF communication module 2 having the same configuration, for example, there is no mistaken operation. "Carried data" contains UART data as inputted from MPU 12. Appended after the "carried data" is a "CRC (cyclic redundancy check)" generated from data in all the RF packets.

In a conventional IR communication system that implements remote control by transmitting to a controlled device an IR signal modulated with control data, and with the objective of using an IR signal to transmit control data with optimal communication quality, a pulse width modulation (PWM) method or a pulse position modulation (PPM) method is used as a primary modulation method, and an IR signal created by secondarily modulating the primarily-modulated pulse modulated signal with a 38 KHz burst wave is transmitted. The controlled device MPU 13 of the IR signal receiving-side controlled device 4A (as illustrated in FIG. 5) has a pulse modulated signal input port for inputting pulse modulated signals that have been demodulated from the IR signal, and for demodulating the control data. So that manufacturing costs will be low, the controlled device MPU 13 used in an IR communication system only has a pulse modulated signal input port and does not have a serial data I/O port. The RF communication module 2 of the present embodiment can also be connected to this type of controlled device MPU 13, but as shown in FIG. 1, the controlled device MPU 13 here is described as having both a serial I/O port and a PWM input port for inputting PWM modulated signals.

So that IR signal transmission does not cause mistaken operation of other unintended devices, the pulse modulated signal formats used with IR systems differ for each pulse modulation method, manufacturer of the controlled device and category of controlled device. Therefore, the controlled device MPU 13 having a pulse modulated signal input port decodes only pulse modulated signals that are in the specified pulse modulated signal format, and so that the communication control unit 8 can output from the pulse signal interface 14 a pulse modulated signal that can be demodulated by the controlled device MPU 13, the communication control unit 8 is additionally equipped with a format storage unit 15 for storing other types of pulse modulated signal formats differing for each pulse modulation method, manufacturer of the controlled device and category of controlled device, and a pulse modulation unit 16 for generating a pulse modulated signal. The other types of pulse modulated signal formats are each associated with an output code (to be described later) and are stored in the format storage unit 15. The pulse modulation unit 16 generates a pulse modulated signal of the pulse modulated signal format read-out from the output code.

An input port for inputting transmission data (TxD) and an output port for outputting reception data (RxD) of the remote control MPU 12 connect to the UART interface 5 of the communication control unit 8, and a RF communication module 2 having the above-described configuration is attached to the remote control transmitter 3. Connected to the remote control MPU 12 is a key input unit 17 for performing an input operation with a predetermined key according to the operation for controlling remotely the controlled device 4, and a display unit 18 for displaying a display indicating the key input, the results of the key input operation and the like. When an operator performs an input operation with the predetermined key of the key input unit 17, the remote control MPU 12 generates remote control data that includes control data corresponding to the key with which the input operation was performed. The remote control data is output as UART data from the output port, via the UART interface 5, to the communication control unit 8 of the remote control-side RF communication module 2.

The UART data outputted from the remote control MPU 12 to the remote control-side RF communication module 2 (hereafter, UART data outputted from the remote control MPU 12 via the UART interface 5 shall be referred to as remote control data) is generated in the UART data format shown in FIG. 3. As also shown in FIG. 3, since the remote control data is inputted and outputted as bit stream data, "start text" and "end text" are added before and after the expression of the data frame to be inputted and outputted. Following the "start text", an "output code" that is allocated 1-byte is determined according to the type of controlled device MPU 13 of the controlled device 4. In the case where serial remote control data is output from the UART interface 5 of the device-side RF communication module 2 to the controlled device MPU 13, the "output code" is "40h" or "A0h". Moreover, in the case where a PWM modulated signal is output from the PWM output interface 14 of the device-side RF communication module 2 to the PWM input port of the controlled device MPU 13, the "output code" is one of "51h" to "53h", "B1h, "B2h" and so on, specifying a pulse modulated signal format that can be demodulated by the controlled device MPU 13. Here, the controlled device MPU 13 demodulates control data from a PWM modulated signal of Company A's format no. 1; the "output code" is "51h" and remote control data is outputted. Since "output codes" of "A0h" and below are not used with the normal operating mode but are instead used with special modes such as shipment inspection and the like, as in the normal operating mode, the remote control data is also output to the RF communication module 2 of a communication target not specified by pairing. The control data is expressed as "transmission data" that is allocated a maximum of 114 bytes, and the number of bytes of data expressed by the "transmission data" is expressed by the 1-byte "data length."

The controlled device 4 attaches to the device-side RF communication module 2 by connecting the serial I/O port of the controlled device MPU 13 to the UART interface 5 of the communication control unit 8 and connecting the PWM input port to the PWM output interface 14. Assuming, for example, that the controlled device 4 is controlled by receiving IR signals modulated with PWM modulated signals of Company A's format no. 2, the controlled device 4 is equipped with an IR signal light-receiving unit 108 that optically receives IR signals, and demodulates the PWM modulated signal from the envelope of an opto-electrically converted waveform of the received signal. The controlled device MPU 13 receives the PWM modulated signal from the PWM input port and demodulates the control data contained in the remote control data, but in the present embodiment, the PWM input port that connects to the IR signal light-receiving unit 108 switches over to connect to the PWM output interface 14 of the device-side RF communication module 2.

Moreover, with the controlled device MPU 13, connecting the input port for receiving transmission data (TxD) to the UART interface 5 of the communication control unit 8 also enables a bit stream of remote control data to be input from the device-side RF communication module 2, thereby enabling control data to be obtained from the either the PWM input port or from the input port for inputting serial data. On the other hand, since the output port for outputting reception data (RxD) is connected to the device-side RF communication module 2, UART data in the UART data format shown in FIG. 3 can be output. For example, operating information and the like of the controlled device 4, i.e. the television, can be included in the UART data "transmission data", carried to the remote control transmitter 3, and displayed on the display unit 18 of the remote control transmitter 3.

Below, an example of transmitting control data with the RF communication system 1 is compared and explained for the cases of the IR communication system-controlled device 4A shown in FIG. 5 and configured so as to be controlled by IR signals, and the RF communication system-controlled device 4B shown in FIG. 6 and configured so as to be controlled by RF signals.

When attempting to raise the sound volume of the controlled device 4, i.e. the television, if an operator performs an input operation with the key input unit 17 of the remote control transmitter 3, the remote control MPU 12 generates, from the key data of the input operated key, 4-byte control data of "data 1 to data 4", for example, the contents of which cause the sound volume to increase. As shown in FIG. 5, the controlled device 4A receives PWM modulated signals of Company A's format no. 1, and if the IR communication-controlled device 4A is to be controlled, the "output code" is "51h", the "transmission data" is the generated "data 1 to data 4", the "data length" is "04h" which expresses the 4 bytes of "data 1 to data 4", and remote control data is output from the output port via the UART interface 5 to the communication control unit 8 of the remote control-side RF communication module 2.

When remote control data is inputted from the UART interface 5, the communication unit 8 generates a RF packet for RF signal transmission. As shown in FIG. 5, the "status code" of this RF packet is assigned a value of "70h" since UART data, i.e. remote control data, will be carried, the above-described remote control data inputted from the UART interface 5 is contained unmodified in the "carried data" that follows the "ID code", and based thereupon, the control data (data 1 to data 4) is included together with the output code of "51h" in the RF packet.

The RF packet generated at the communication unit 8 is output via SPIs 11 and 10 to the RF communication circuit unit 9. The RF communication circuit unit 9 outputs modulated signals that have been DSSS modulated/demodulated to the printed antenna 7, and transmits [those signals] as RF signals on one of the channels in the 2.4 GHz band.

When the printed antenna 7 of the device-side RF communication module 2 receives this RF signal, the signal is DSSS demodulated at the RF communication circuit unit 9, and bit stream data of the demodulated RF packet shown in FIG. 5 is output via SPIs 10 and 11 to the communication control unit 8 (control MPU). Because the status code is "70h" and remote control data is contained in the received RF packet data, the communication control unit 8 selects, based on the "output code", a method for outputting to the device-side microcomputer 13.

The "output code" is "51h", expressing that a PWM modulated signal using Company A's format no. 1 is outputted from the PWM output interface 14, and therefore, at the communication control unit 8, Company A's format no. 1 is read-out from the format storage unit 15, and according to Company A's format no. 1, the pulse modulation unit 16 implements PWM modulation with the inputted remote control data, and the modulated PWM signal from the PWM output interface 14 is outputted to the PWM input port of the device-side microcomputer 13.

This PWM modulated signal outputted to the device-side microcomputer 13 is, as shown in FIG. 5, a continuous pulse signal having a header and a stop bit at the front and end thereof, formed from two types of pulse widths generated according to the binary data values of continuous PWM data comprised, for example, of a custom code 1 expressing that the signal is intended for a Company A product, a custom code 2 expressing that the product category is "television", a data code expressing the control data (data 1 to data 4) contained in the remote control data, and an inversion data code that inverts all data of the data code.

The device-side microcomputer 13 demodulates the PWM modulated signal from the PWM modulated signal inputted from the PWM input port, and in accordance with the control data, the content of which is for raising sound volume, implements control so as to raise the sound volume of the controlled device 4A, i.e. the television. Accordingly, even if the device-side microcomputer 13 inputs from the PWM input port and demodulates only PWM modulated signals of Company A format no. 1, without modifying the structure and by simply connecting the PWM input port to the PWM output interface 14 of the RF communication module 2, the controlled device 4A also can be controlled remotely by RF signals.

Thus, even if the device-side microcomputer 13 receives and demodulates a pulse modulated signal of a different format, by simply associating that format with an output code and storing that format in the format storage unit 15, the outputting of pulse modulated signals that can be demodulated by the device-side microcomputer 13 is possible.

Moreover, without actually transmitting a pulse modulated signal or a modulated signal thereof as an IR signal, because the signal is generated at the communication control unit 8 on the controlled device 4A side, the communication environment and the transmission and reception elements do not cause pulse distortion of the pulse modulated signal, enabling the device-side microcomputer 13 to demodulate the control data correctly.

In the case where the same remote control operation (to raise the sound volume) is to be performed for the RF communication system-controlled device 4B configured so as to be controlled by RF signals, serial remote control data is outputted from the UART interface 5 of the device-side RF communication module 2, and therefore, the "output code" of remote control data generated by the remote control MPU 12 is "40h", but other data is the same.

Accordingly, as shown in FIG. 6, RF packet data transmitted with RF signals from the remote control transmitter 3, with the exception of the "output code" of the remote control data being "40h", is the same as the RF packet data shown in FIG. 5, and until this RF packet data is input to the communication control unit 8 of the device-side RF communication module 2 that received RF signals from the printed antenna 7, [the operation] is the same as described above, and an explanation is omitted.

Because the status code of the RF packet data is "70h", the communication control unit 8 selects, based on the "output code" of the remote control data contained in the RF packet data, a method for outputting to the device-side microcomputer 13. Since the "output code" is "40h", as shown in FIG. 6, the unmodified remote control data portion of the RF packet data is output, as a bit stream of transmission data (TxD), from the UART interface 5 to the input port of the device-side microcomputer 13. The internal UART converts this remote control data into parallel data handled by a bus line, and the device-side microcomputer 13 implements control, according to the control data (data 1 to data 4) contained in the remote control data, so as to raise the sound volume of the controlled device 4B, i.e. the television. Accordingly, even if the device-side microcomputer 13 is a general-purpose microcomputer not having a pulse modulated signal input port, simply connecting the UART interface 5 of the RF communication module 2 to the serial data input port enables the controlled device 4B to be controlled remotely by a RF communication system.

Moreover, since this device-side microcomputer 13 has an output port for outputting reception data (RxD) and since RF signals can be transmitted and received between a pair of RF communication modules 2, by connecting the output port to the UART interface 5 of the RF communication module 2, UART data having the UART data format shown in FIG. 3 generated by the device-side microcomputer 13 can be transmitted to the remote control transmitter 3 as a RF signal. Accordingly, with a RF communication system, in order to prevent mistaken transmission, the required pairing process (process of determining the combination of a pair of transceiver apparatuses) must be easily implemented with bi-directional RF signal transmission and reception. Moreover, operating information (such as the television channels being received, audio song information, and the like) of the controlled device 4B to be controlled remotely can be displayed on the display unit 18 of the remote control transmitter 3 side and verified locally.

According to the above-described example of the present invention, the antenna of the RF communication module 2 is a printed antenna 7 formed by print-wiring on one surface of the printed circuit board 6. Alternatively, a chip antenna may also be used.

Moreover, the RF communication module 2 is a bi-directional module capable of transmitting and receiving RF signals. Alternatively, a RF signal reception-only module connectable to the controlled device 4 side only may also be used.

Moreover, the format storage unit 15 and the pulse modulation unit 16 may also be configured as a storage element and circuit element separate from the control MPU 8, and furthermore, the pulse signal format stored in the format storage unit 15 may also be a PPM modulated signal or a signal format of another modulation method.

It is within the scope of the present invention to include all foreseeable equivalents to the elements of the present invention as described with reference to FIGS. 1-6. The examples provided are not to be interpreted as limiting the invention beyond what is claimed. The examples may also be extended, for example, in the following manner. As described above, the remote control transmitter 3 and the controlled device 4 are a paired example. The present invention may also be applied to a RF communication system that remotely controls a plurality of controlled devices 4 from a single remote control transmitter 3.

What is claimed is:

1. A RF communication module comprising:

an antenna for receiving a Radio Frequency (RF) signal, the RF signal having been modulated with remote control data and transmitted from a remote control transmitter;

a RF communication circuit unit for demodulating remote control data from the RF signal received by the antenna; and a communication control unit having:

a Universal Asynchronous Receiver Transmitter (UART) interface, freely connectable to a device-side microcomputer of a device to be controlled remotely by a remote control transmitter, for outputting the remote control data demodulated at the RF communication circuit unit as bit stream remote control data, and a pulse signal interface, freely connectable to a pulse modulated signal input port of the device-side microcomputer, for outputting a pulse modulated signal that is pulse modulated with the remote control data demodulated at the RF communication circuit unit;

wherein the remote control data transmitted by the RF signal is output freely, as either a bit stream or pulse modulated signal, to the device-side microcomputer of the controlled device.

2. The RF communication module of claim 1, wherein, the RF signal is modulated with remote control data containing an output code for selecting either UART output or pulse signal output; and the communication control unit outputs bit stream remote control data from the UART interface in the case where an output code for selecting UART output is contained in the remote control data demodulated at the RF communication circuit unit, and outputs a pulse modulated signal from the pulse signal interface in the case where an output code for selecting pulse signal output is contained therein.

3. The RF communication module of claim 2, wherein, the communication control unit has a format storage unit for associating each of one or more pulse modulated signal formats with an output code, and for storing the one or more pulse modulated signal formats that can be demodulated by device-side microcomputers of a plurality of controlled devices; and in the case where an output code associated with one of the pulse modulated signal formats is contained in the remote control data demodulated at the RF communication circuit unit, the communication control unit reads out the pulse modulated signal format associated with the output code from the format storage unit, and according to the read-out pulse modulated signal format, outputs a pulse modulated signal having been pulse modulated with the remote control data.

4. The RF communication module of claim 1, wherein, the RF communication circuit unit and the communication control unit are formed with IC chips mounted on the same module substrate, and the antenna is formed from a printed antenna that is printed on the module substrate.

5. A RF communication system comprising:

a pair of identically configured RF Radio frequency (RF) communication modules each equipped with a communication control unit having:

a UART interface, connectable to a remote control-side microcomputer that generates remote control data for a remote control transmitter and to a device-side microcomputer that operates a controlled device according to the remote control data, for inputting and outputting bit stream remote control data with the remote control-side microcomputer or the device-side, microcomputer, and a pulse signal interface, connectable to a pulse modulated signal input port of the device-side microcomputer, for outputting a pulse modulated signal, having been pulse modulated with the remote control data, to the device-side microcomputer;

an antenna for transmitting and receiving a RF signals modulated with the remote control data; and a RF communication circuit for outputting, to the antenna, a RF signal modulated with the remote control data to be outputted from the communication control unit and for outputting, to the communication control unit, remote control data demodulated from the RF signal received by the antenna; wherein the UART interface of one of the RF communication modules connects to the remote control-side microcomputer, and according to an input operation to the remote control transmitter, an RF signal modulated with the remote control data generated at the remote control-side microcomputer is transmitted from the antenna of the one RF communication module;

the Universal Asynchronous Receiver Transmitter (UART) interface or the pulse signal interface of the other RF communication module connects to the device-side microcomputer or the pulse modulated signal input port of the device-side microcomputer; and the remote control data to be transmitted with a RF signal from the one RF communication module is outputted as a bit stream or pulse modulated signal to the device-side microcomputer of the controlled device.

6. The RF communication system of claim 5, wherein an output code for selecting either UART output or pulse signal output is contained in the remote control data generated at the remote control-side microcomputer; and the communication control unit of the other RF communication module outputs bit stream remote control data from the UART interface in the case where an output code for selecting UART output is contained in the remote control data demodulated at the RF communication circuit unit, and outputs a pulse modulated signal from the pulse signal interface in the case where an output code for selecting pulse signal output is contained therein.

7. The RF communication system of claim 6, wherein the communication control unit has a format storage unit for associating each pulse modulated signal format with an output code and for storing pulse modulated signal formats that can be demodulated by the device-side microcomputers of a plurality of controlled devices; and in the case where an output code associated with a specific pulse modulated signal format is contained in the remote control data demodulated at the RF communication circuit unit of the other RF communication module, the communication control unit of the other RF communication module reads out the pulse modulated signal format associated with the output code from the format storage unit, and according to the read-out pulse modulated signal format, outputs a pulse modulated signal having been pulse modulated with the remote control data.

8. The RF communication module of claim 5, wherein, the RF communication circuit unit and the communication control unit are formed with IC chips mounted on the same module substrate, and the antenna is formed from a printed antenna that is printed on the module substrate.

9. A RF communication system comprising:

a remote control-side microcomputer for generating remote control data that includes control data for controlling operation of a controlled device according to an input operation;

a remote control transmitter equipped with a Radio Frequency (RF) transmission circuit unit for modulating a RF signal with remote control data generated by the remote control-side microcomputer and for outputting a modulated signal from a transmission antenna;

a RF reception circuit unit for demodulating remote control data from a RF signal received at a reception antenna;

a device-side microcomputer for demodulating control data from a pulse modulated signal received at a pulse signal input port of the device-side microcomputer;

a format storage unit for associating each of one or more pulse modulated signal formats with an output code and for storing the pulse modulated signal formats that can be demodulated by device-side microcomputers of a plurality of controlled devices; and a controlled device equipped with a pulse modulation circuit, wherein when an output code associated with a specific pulse modulated signal format is contained in the remote control data demodulated at the RF reception circuit unit, the pulse modulation circuit reads out the pulse modulated signal format associated with the output code from the format storage unit, and according to a read-out pulse modulated signal format, outputs to the pulse signal input port of the device-side microcomputer a pulse modulated signal, having been pulse modulated with control data, contained in the remote control data; wherein the remote control-side microcomputer includes an output code, specifying a pulse modulated signal format that can be demodulated by the device-side microcomputer of the controlled device, together with control data, in the remote control data, and the pulse modulation circuit of the controlled device reads out the pulse modulated signal format associated with the output code contained in the remote control data, and according to a read-out pulse modulated signal format, outputs to the device-side microcomputer, a pulse modulated signal having been modulated with control data.

10. The RF communication system of claim 9, wherein the remote control-side microcomputer includes an Identification (ID) code in the remote control data, the controlled device compares the ID code in the remote control data to an ID code of the controlled device, and the controlled device rejects the remote control data when the ID code in the remote control data and the ID code of the controlled device do not match.

11. The RF communication system of claim 9, further comprising a plurality of controlled devices, wherein each of the devices in the plurality of controlled devices is controlled by remote control data transmitted by the remote control-side microcomputer.

12. The RF communication module of claim 2, wherein, the RF communication circuit unit and the communication control unit are formed with Integrated Circuit (IC) chips mounted on the same module substrate, and the antenna is formed from a printed antenna that is printed on the module substrate.

13. The RF communication module of claim 3, wherein, the RF communication circuit unit and the communication control unit are formed with Integrated Circuit (IC) chips mounted on the same module substrate, and the antenna is formed from a printed antenna that is printed on the module substrate.

14. The RF communication module of claim 6, wherein, the RF communication circuit unit and the communication control unit are formed with Integrated Circuit (IC) chips mounted on the same module substrate, and the antenna is formed from a printed antenna that is printed on the module substrate.

15. The RF communication module of claim 7, wherein, the RF communication circuit unit and the communication control unit are formed with Integrated Circuit (IC) chips mounted on the same module substrate, and the antenna is formed from a printed antenna that is printed on the module substrate.

* * * * *